July 26, 1949.  B. JABLONSKY  2,477,375
METHOD OF MANUFACTURING HOLLOW ARTICLES
OF BONDED FIBROUS LAMINAE
Filed March 29, 1945
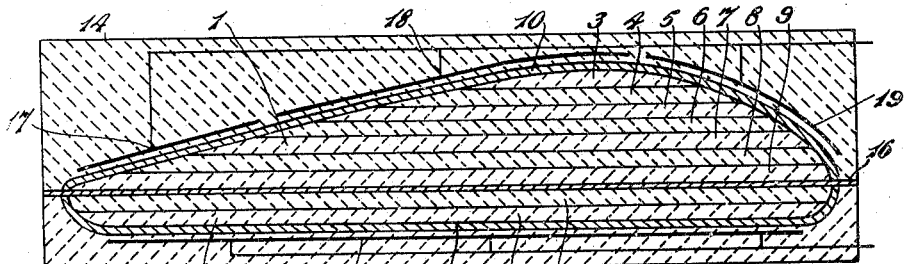
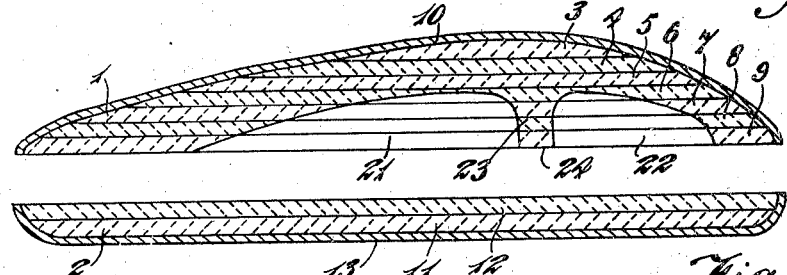
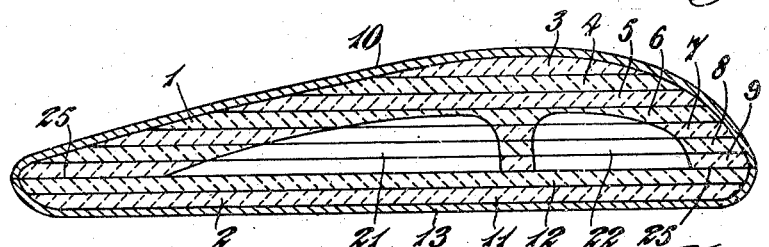
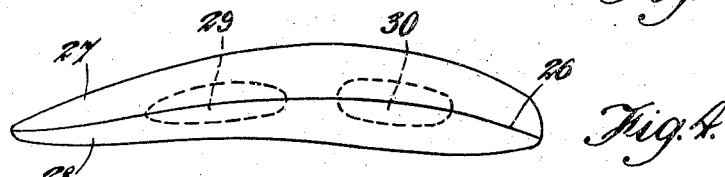
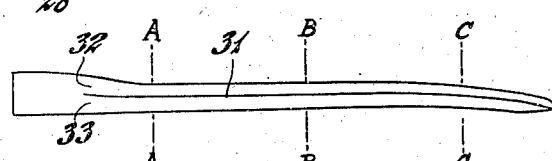
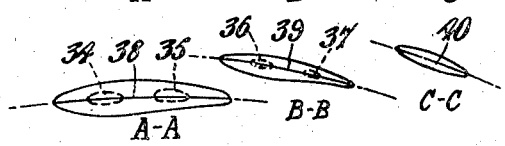
Inventor
BRUNO JABLONSKY
by
W. E. Evans
Attorney Patented July 26, 1949

2,477,375

UNITED STATES PATENT OFFICE 2,477,375

METHOD OF MANUFACTURING HOLLOW ARTICLES OF BONDED FIBROUS LAMINAE

Bruno Jablonsky, Waddon, Croydon, England

Application March 29, 1945, Serial No. 585,536
In Great Britain March 22, 1944

3 Claims. (Cl. 154—110)

This invention relates to the manufacture of hollow articles of varying cross sectional area of the type comprising two or more recessed parts of bonded fibrous laminae glued together to form a hollow article. It has been customary to mould such parts singly and individually. A sound gluing joint however could only be attained if the joining faces of the parts were carefully finished and fitted to offer joining faces of similar shape. According to this invention the production of articles of the type described is simplified and shortened by pressing the joining faces on each other to identical shape whilst the parts are moulded, so that laborious matching operations can be dispensed with.

A preferred embodiment of the invention comprises making a divisional stepped core enveloped in a divisional skin by cutting a plurality of laminae smaller than the respective cross sections of a moulding space, assembling the laminae all of which, except those at the dividing level are provided with an adhesive, in such manner that at one side or at both sides of a larger lamina or a stack of larger laminae other laminae are arranged whose size on the whole decreases gradually to the smallest lamina or laminae at the end or ends of the stepped core, arranging skin laminae provided with an adhesive around the stepped core to form a curved envelope which is divided at the same level as the core, the sizes and shapes of the core and of the skin laminae being so chosen that after compression the laminae fill the moulding space, moulding simultaneously in the same die under pressure or pressure and heat the divisions, each comprising a part core and part skin, separating at the dividing level the moulding divisions, recessing at least one of them at the side which during the moulding process was pressed against the matching side of the neighbouring division and gluing together the matching sides of the core and skin divisions.

It will be understood that according to this invention perfect gluing of the divisional parts of a hollow body is made possible by moulding as it were upon each other joining faces of these parts so that they fit accurately together. Consequently in its broadest aspect the invention resides in a method of manufacturing a hollow article of varying cross sectional area comprising simultaneously moulding in a common die divisional parts consisting of fibrous laminae provided with an adhesive so as to be bonded together within each division but not between the divisions, the opposing faces of the divisions being pressed upon each other to form similar joining faces, separating the divisions after the moulding process, recessing at least one division at the side which during the moulding process and in the finished article faces another division, and gluing the matching sides of the divisions together.

A material which is not adhesive or is adverse to adhesion, e. g. a layer of ductile metal, metal foil and the like, can be inserted between the stacks of laminae forming the divisional parts to facilitate their separation after the moulding. Heat can be generated as customary in the dies, or electrically in the moulding material, e. g. by a high frequency field, using as electrodes metallic dies, or thin metal layers arranged between non-metallic dies and the moulding material or between the divisions of the laminated body.

One or more recesses can be cut with suitable tools in the same division of an article and one or more ribs can be left standing between two or more recesses to stiffen the body and to provide additional gluing surfaces.

Recesses may be provided in one only of two joining divisions or in both divisions and the recesses may be provided at one side of a divisional part or at both sides of such a part which is situated between two other divisional parts. The openings of recesses of two joining divisions may be aligned or staggered in relation to each other.

Keying means, tenons and mortices, dowels and the like can be provided to take up shearing stresses between the divisions and the axes of the dowels are preferably arranged in the plane of the joining faces and in directions perpendicular to the surface of the finished article, i. e. to the circumference of the joining faces.

More details will be seen from the following description referring to the drawings which illustrate diagrammatically and by way of example some embodiments of the invention.

Figures 1 to 3 are sectional views of a propeller blade in three stages of its manufacture, showing in Figure 1 two stacks of laminae forming divisional parts placed in a common die, in Figure 2 the two divisions separated after the moulding process and one of the divisions recessed, and in Figure 3 the finished hollow article.

Figure 4 illustrates a propeller blade comprising divisions with curved joining faces.

Figure 5 illustrates a propeller blade comprising two divisions whose joining faces are twisted as indicated by the cross sections shown in Figure 6, whereby the joining lines between the laminae and the hatching of the laminae are omitted.

As shown in Figure 1 two stacks 1, 2 of fibrous laminae forming the divisions are arranged in the same moulding space of a die to be moulded simultaneously and pressed against each other at the joining faces. The division or portion 1 consists of a number of flat laminae 3—9 and of a skin lamina 10 or a plurality of such laminae which follow the curved surface along the edges of the flat laminae and cover these edges. The divisional portion 2 consists of flat laminae 11, 12 and a skin lamina 13 or skin laminae.

The laminae are so cut to size and shape that after their compression they fill the moulding space.

A thin metal layer, e. g. a metal foil 16 is arranged between the upper die 14 and the lower die 15 to separate the portion 1 from the portion 2. The sides of the portions which face the foil 16 are not provided with any adhesive so that the portions 1 and 2 can be separated from foil 16 after the moulding process. The foil 16 is so ductile that the faces of the portions 1 and 2 contacting the said foil are virtually pressed upon each other to similar shapes.

The moulding dies can be heated in the customary manner by steam, hot water or electricity, and/or heat can be electrically generated in the laminated body. For this purpose foils 17, 18, 19, 20 arranged at the faces of the dies can be connected to high frequency sources. The foil 16 between the portions can be heated by eddy currents generated by a high frequency field, or the foil can be connected to a source of high frequency current to act as an electrode or condenser plate. In the latter case two electric fields are formed at the two sides of the foil 16 and can be individually adjustable. With the arrangement shown the dies are made of insulating material, e. g. bonded fibrous laminae which are highly compressed, concrete and the like.

After the moulding process the two portions are separated and at least one of them is recessed. Figure 2 shows two recesses 21, 22 in portion 1. A rib 23 left between these recesses serves for stiffening the structure and also provides an additional joining or gluing area 24.

As shown in Figure 3 the two portions are joined together by gluing, preferably with a cold setting glue. The area of the joining faces 24 and 25 can be made sufficiently wide to withstand the prevailing shearing stresses and the joint can be strengthened by dowels (not shown in the drawing) arranged with their axes in the plane of the joint and perpendicular to the circumference of the joining faces.

As shown in Figure 4 the joining faces 26 of the portions 27, 28 can be curved. The curvature of such faces can be obtained by moulding stacks of plane laminae in dies of suitable shape. As the joining faces are moulded upon each other it may be with the intermediary of a thin adhesive-repelling layer only, they are of similar curvature and afford a perfect gluing joint after the recesses 29, 30 have been hollowed out in both portions 27, 28.

As shown in Figures 5 and 6 the joining faces 31 of the portions 32, 33 of an airscrew blade can be twisted, Figure 5 is a longitudinal view of the blade and Figure 6 shows the position of three sections along the lines A—A, B—B and C—C viewed in the direction of the axis of the blade. It will be seen that the joining lines 38, 39, 40 of the three sections are not parallel to each other due to the twist caused by the different pitch angles. The joining lines 38, 39, 40 can be curved similar to the joining line 26 shown in Figure 4. By the method of the invention twisted joining faces which are similar to each other are formed on the portions 32, 33 by moulding stacks of plane laminae in dies of suitable shape. The recesses in the cross sections A—A and B—B are denoted 34, 35 and 36, 37 respectively.

For a method according to this invention laminae of any suitable inorganic or organic fibrous material, wood veneers, paper sheets, textile fabric and the like, or a combination of such laminae can be used and may be interleaved with metallic layers which remain in the finished article, e. g. thin metal foils which may be perforated, wire netting and the like.

Groups of laminae can be united to boards forming intermediary components of which the article is composed.

The laminae may be cut to shape, stamped, or routed to templates by methods which are known in the art.

A natural resin or glue, or a synthetic binder, e. g. of a thermoplastic or a thermosetting type, or a cold setting binder, e. g. a phenolic resin containing a hardening agent may be used. The fibrous laminae may be impregnated, or coated with adhesive by dipping, spraying or brushing, or solid films such as are known under the trademark "Tego" may be interleaved between the laminae. An adhesive may be incorporated in the fibrous material whilst it is manufactured, e. g. in a paper machine, and fibres may be dispersed in the adhesive, to form a solid film which can be arranged between the laminae.

The laminae, or laminated boards which form intermediary components, or a body built up with such laminae or boards can be subjected to high pressure with a view to densifying and strengthening the material. By interleaving shorter laminae, i. e. laminae which do not reach throughout the whole article, the density and strength can be increased at points and transition zones can be provided by gradually varying the dimensions of the laminae which are interleaved at certain points only.

The grains of the parallel laminae and of the enveloping laminae, i. e. the grains of the core laminae and of the skin laminae, can be arranged to meet stresses in various directions.

The laminae, and it may be the dies, can be preheated prior to the moulding process either in an oven as is known in the art or in a high frequency electric field.

The number, the thickness, the specific gravity of the laminae, the nature and the proportion of the adhesive and also the moulding pressure can be so chosen that an article of a certain predetermined weight and specific gravity is obtained. Laminae of certain thickness to which a certain proportion of adhesive is applied can be used for the stacks of plane laminae forming the core, and laminae of different thickness to which a different proportion of adhesive (similar or dissimilar to the adhesive used on the plane laminae) is applied can be used for the skin of the article, the thicknesses of the laminae and the proportions of adhesive being so chosen that after the laminae have been united under pressure the density of the skin is higher than that of the core.

Modifications are possible within the scope of this invention. The dies may be heated by steam, hot water, and/or electric heating resistances as known in the art.

Whilst a laminated propeller blade is shown in the drawings by way of example it will be understood that the invention is applicable to any hollow article of bonded fibrous laminae, e. g. aerofoils, helicopters, constructional parts for aircraft or vehicles, spares and the like.

I claim as my invention:

1. Method of manufacturing from bonded fibrous laminae a hollow article of varying cross-sectional area comprising a divisional stepped core enveloped in a divisional skin, by cutting a plurality of laminae smaller than the respective cross-sections of a moulding space, assembling the laminae all of which, except those at the dividing level, are provided with an adhesive binder, in such manner that at least at one side of at least one larger lamina, the size of the laminae decreases on the whole gradually to the smallest lamina of the stepped core, arranging other laminae provided with an adhesive around the stepped core to form a curved skin which is divided at the same level as the core, the sizes and shapes of the core and of the skin laminae being so chosen that after compression the laminae fill the moulding space, moulding simultaneously in the same die under pressure the divisional parts, each comprising a part core and a part skin, separating at the dividing level the moulded divisions, recessing at least one of them at the side which during the moulding process was pressed against the matching side of the neighbouring division and gluing together the matching sides of the core and skin divisions.

2. Method of manufacturing from bonded fibrous laminae a hollow article of varying cross-sectional area comprising a divisional stepped core enveloped in a divisional skin, by cutting a plurality of laminae smaller than the respective cross-sections of a moulding space, assembling the laminae, all of which, except those at the dividing level, are provided with an adhesive binder, in such manner that at least at one side of at least one larger lamina the size of the laminae decreases on the whole gradually to the smallest lamina of the stepped core, arranging other laminae provided with an adhesive around the stepped core to form a curved skin which is divided at the same level as the core, the sizes and shapes of the core and of the skin laminae being so chosen that after compression the laminae fill the moulding space, moulding simultaneously in the same die under pressure and heat the divisional parts, each comprising a part core and a part skin, separating at the dividing level the moulded divisions, recessing at least one of them at the side which during the moulding process was pressed against the matching side of the neighbouring division and gluing together the matching sides of the core and skin divisions.

3. Method of manufacturing from bonded fibrous laminae a hollow article of varying cross-sectional area comprising a divisional stepped core enveloped in a divisional skin, by cutting a plurality of laminae smaller than the respective cross-sections of a moulding space, assembling the laminae all of which, except those at the dividing level, are provided with an adhesive binder, in such manner that at least at one side of a stack of larger laminae the size of the laminae decreases on the whole gradually to the smallest lamina at the end of the stepped core, arranging other laminae provided with an adhesive around the stepped core to form a curved skin which is divided at the same level as the core, the sizes and shapes of the core and of the skin laminae being so chosen that after compression the laminae fill the moulding space, moulding simultaneously in the same die under pressure the divisional parts, each comprising a part core and a part skin, separating at the dividing level the moulded divisions, recessing at least one of them at the side which during the moulding process was pressed against the matching side of the neighbouring division and gluing together the matching sides of the core and skin divisions.

BRUNO JABLONSKY.

REFERENCES CITED

The following references are of record in the file of this patent:

UNITED STATES PATENTS

| Number | Name | Date |
| --- | --- | --- |
| 2,149,507 | Camfield | Mar. 7, 1939 |
| 2,205,891 | Sprenger | June 25, 1940 |
| 2,315,615 | Guhl | Apr. 6, 1943 |
| 2,423,647 | Gurvitch | July 8, 1947 |

OTHER REFERENCES

"Air Trails," vol. X, No. 3, June 1938, pp. 70–73, 86; Street & Smith Publications, Inc., New York, N. Y.